United States Patent [19]

Kauzal

[11] 4,201,564
[45] May 6, 1980

[54] ORGANIC FERTILIZER

[76] Inventor: Gabriel P. Kauzal, P.O. Box 1, Potts Point, Sydney, Australia, 2011

[21] Appl. No.: 851,742

[22] Filed: Nov. 15, 1977

[51] Int. Cl.² .................. C05B 17/00; C05F 3/00
[52] U.S. Cl. .......................... 71/20; 71/15; 71/16; 71/22
[58] Field of Search .......... 71/19, 15, 64 JC, 11, 71/18, 16, 17, 20; 195/29

[56] References Cited

U.S. PATENT DOCUMENTS

| | | | |
|---|---|---|---|
| 330,075 | 11/1885 | Wemple | 71/15 |
| 2,294,428 | 9/1942 | Stockhamer | 195/29 |
| 2,554,632 | 5/1951 | Nesset | 195/29 |
| 2,576,066 | 11/1951 | Caldwell | 195/29 |
| 4,032,318 | 6/1977 | Lovness | 71/64 JC |
| 4,043,788 | 8/1977 | Fryer | 71/16 |

FOREIGN PATENT DOCUMENTS

| | | | |
|---|---|---|---|
| 46-24051 | 7/1971 | Japan | 71/11 |
| 23045 | of 1905 | United Kingdom | 71/15 |
| 425888 | 10/1974 | U.S.S.R. | 71/18 |

OTHER PUBLICATIONS

Bruttini, Arturo, "Uses of Waste Materials," P. S. King and Son, Ltd., London, 1923.
"Kirk Othmer Encyclopedia of Technology", p. 428.

*Primary Examiner*—Joseph Scovronek
*Assistant Examiner*—Chris Konkol
*Attorney, Agent, or Firm*—Emory L. Groff, Jr.

[57] ABSTRACT

An organic fertilizer is obtained from the treatment of organic material being material of animal origin. The organic material is digested, for example by potassium hydroxide and the product is neutralized. A preservative is included in the final mixture and other additives such as phosphates, sulphates and potassium sources, as well as molasses and gum may also be included.

7 Claims, No Drawings

ORGANIC FERTILIZER

This invention relates to a fertilizer and more particularly to an organic fertilizer suitable for stimulating and promotion growth of plant life.

It is well known that certain quantities of the elements potassium, nitrogen and phosphorus are generally required for optimum plant growth. Garden soil and other growing media are often deficient in these elements and the primary purpose of most fertilizers is to make available to plants one or more of these elements in a form which can be assimilated by the plants.

The present invention concerns a fertilizer which can make available to plants all three elements in an assimilable form and which has an added advantage of stimulating soil bacteria.

Accordingly, this invention provides an organic fertilizer which is obtained from the treatment of organic material as hereafter defined and which may optionally include additives to compensate for plant and/or growing media deficiencies.

The term "organic material" as used herein is defined as material composed of or containing matter of animal origin. Especially preferred organic materials for the purpose of this invention are chosen from the group comprising animal organs such as intestines and lungs, blood from animals or fish, bones, commercial meat meal, bone meal or blood meal (which may be obtained from abatoirs, for example) and fish meal. The term "animal" as used herein includes fish and birds.

This invention also provides a process for the manufacture of an organic fertilizer, said process comprising digesting organic material with a suitable digesting agent, neutralizing the digestion product and mixing the neutralized digestion product with a suitable preservative.

The organic material which preferably consists of a mixture of two or more members of the above-mentioned group, may be digested by subjection to chemical maceration, using a suitable chemical, especially potassium hydroxide. Alternately, the organic material may be digested by an enzyme such as pepsin, after the pH of the organic material has been adjusted by the addition of, for example, dilute nitric acid. The concentration of the chemical or digesting agent and the length of treatment time may be varied within wide limits and may depend on a number of factors, such as the quantity of moisture in the organic material, the particle size of the organic material and the mode of treatment (for instance, whether stirring or agitation is employed to facilitate the treatment).

When potassium hydroxide is the chemical used, its concentration is preferably 15% by weight and it is used in sufficient volume to complete maceration of the organic material within 2 to 6 hours. Neutralization is conveniently effected with concentrated nitric acid, to yield a pH of approximately 6.0.

When an enzyme such as pepsin is used, the concentration is preferably 1% by weight. Since this enzyme is used in an acidic pH, neutralization may be effected by an alkaline agent such as potassium hydroxide.

As stated above, the fertilizer of the invention may contain additives to compensate for deficiencies in plants and/or in growing media. Suitable additives are phosphates, which can be derived from bone meal or which can be in the form of superphosphate, for example; sulphates, such as di- or mono- ammonium sulphate, ferric sulphate, or magnesium sulphate; and potassium sources such as potassium chloride or potassium sulphate. It will be appreciated that potassium hydroxide, used as digesting agent or neutralizing agent, is also a potassium source.

To provide a source of energy for soil bacteria and also to assist in the stabilisation of the organic fertilizer of the invention, a carbohydrate such as molasses and a vegetable gum or gums such as guar gum may be added, preferably in the proportion of 0.1% by weight of the total mixture. It is found that when molasses and guar gum are incorporated the organic fertilizer assumes the form of a smooth creamy colloidal suspension which is ideally screened to a particle size of 40 mesh.

The effectiveness of the fertilizer of the present invention is enhanced even further when giberellic acid, a plant growth stimulator, is added to the mixture. As little as 0.01 p.p.m. of giberellic acid is sufficient.

Finally, to improve the shelf life of the fertilizer of the invention and to prevent decomposition, a preservative such as sodium benzoate and/or borax is included in the fertilizer mixture.

The invention will now be described with reference to the following Examples, which are for the purpose of illustration only and which are not intended to limit the scope of this invention.

EXAMPLE 1

100 kg of 92% (by weight) potassium hydroxide are dissolved in 360 liters of water. The reaction is exothermic and the heat of reaction assists dissolution. 150 kg of abattoir meat meal (50% protein by weight) and 5 kg of abattoir blood meal (90% protein by weight) are added to the potassium hydroxide solution and the mixture is stirrred well for 2 to 4 hours to complete hydrolysis.

The following ingredients are stirred into the hydrolysed mixture: 100 kg urea, 62.5 kg superphosphate, 75 kg ammonium sulphate, 62.5 kg potassium sulphate, 9 kg magnesium sulphate. The mixture is neutralised to a pH of about 6 by the slow addition of 54 liters of 60% nitric acid, accompanied by slow stirring.

Next 0.5 liter 85% phosphoric acid, 9 kg guar gum, 30 kg molasses and 0.2% by weight sodium benzoate (based on the total weight of final mixture) are well stirred into the mixture, which is finally diluted with water to 800 liters.

The resulting product is a creamy, viscous fluid having an N:P:K value of 6.98:2.08:5.73 respectively.

EXAMPLE 2

The procedure in Example 1 was followed except that an equivalent amount of protein meal derived from fish and whale was substituted for the abattoir meat meal and blood meal.

EXAMPLE 3

The procedure in Example 1 was followed except that an equivalent amount of ground feathers, hoofs and horns was substituted for the abattoir meat meal and blood meal.

EXAMPLE 4

100 kg of 92% potassium hydroxide are dissolved in 150 liters of water. 100 kg of animal organs (offal) and 25 kg blood powder (i.e. dehydrated blood) are added to the potassium hydroxide solution and the mixture is permitted to react for two hours. Reaction is exothermic and is assisted by agitation via a stirring device.

At the completion of two hours, 0.3% by weight of pepsin (based on the weight of offal and blood powder) is stirred into the mixture. Also added are 100 kg urea, 4% (by weight based on the total mixture) of each of potassium sulphate, superphosphate, ammonium sulphate and mono-ammonium sulphate, 56 liters of concentrated nitric acid, 0.01 ppm giberellic acid, and (the following percentages being based by weight on the total mixture):
 0.1% sodium benzoate,
 0.01% borax, 5% molasses,
 0.01% ferric sulphate, 0.1% magnesium sulphate.
Finally, to increase aesthetic appeal of the fertilizer, a masking compound such as perfume is incorporated.

The fertilizer produced has a content of (by weight) 45% water, 24% organic material and 31% inorganic material. The N:P:K value is 8.00:2.00:5.80 respectively.

EXAMPLE 5

100 kg of animal organs and 25 kg of blood powder as used in Example 4 were mixed with dilute nitric acid until the pH of the mixture had dropped to 4. Then 1% by weight of pepsin was added and the mixture was permitted to digest, with stirring, for two hours. The reaction was exothermic. At the end of two hours, sufficient concentrated (60%) nitric acid was added to make up the total concentrated nitric acid content to 56 liters as in example 4. Urea, potassium sulphate, superphosphate, ammonium sulphate, mono-ammonium sulphate, giberellic acid, sodium benzoate, borax, molasses, ferric sulphate and magnesium sulphate were added in the proportions set out in Example 4.

Then sufficient 92% potassium hydroxide to neutralise the mixture (to pH 6) was added. The resultant fertilizer, masked as in Example 4, had the same analysis as the fertilizer of Example 4.

It will be appreciated that the above Examples illustrate only some of the many variations which are within the ambit of the invention. It will also be realised that quantities stated are, of necessity, approximate.

The organic fertilizer produced by each of examples 1 to 5 is in concentrated form and requires dilution before it can be applied to plant foliage and/or soil or other growing media. Dilution is preferably effected with water and recommended dilution is one part of fertilizer to 320 parts of water. It is found that very good results can be obtained if the diluted fertilizer is applied to growing media or foliage, including lawns at a rate of 5 liters per 9 square meters, repeated at fortnightly intervals. Best results are observed where both foliage and growing media are wet thoroughly with the fertilizer solution.

I claim:

1. A method for preparing organic fertilizer containing sufficient amounts of potassium, nitrogen and phosphorous to stimulate and promote the growth of plant life consisting essentially of the steps of substantially completely digesting organic material of animal origin with an acidic aqueous solution of an enzyme, substantially neutralizing the digested product with alkaline material, admixing the neutralized, digested product with a preservative against decomposition thereof and adding thereto sufficient quantities of a member selected from the group consisting of phosphates, sulfates, potassium, and mixtures thereof to provide the requisite amounts of plant growth stimulants.

2. The method of claim 1 wherein said member is selected from the group consisting of bone meal, superphosphate, di-ammonium sulphate, mono-ammonium sulphate, ferric sulphate, magnesium sulphate, potassium chloride, potassium sulphate, and mixtures thereof.

3. The method of claim 1 wherein said enzyme is pepsin.

4. The method of claim 1 wherein said digestion is effected at a pH of about 4.

5. The method of claim 1 wherein said aqueous solution of enzyme is rendered acidic by nitric acid.

6. The method of claim 1 wherein neutralization is effected with an aqueous solution of potassium hydroxide.

7. An organic fertilizer prepared by the method of claim 1.

* * * * *